US00RE40638E

(19) United States
(12) Reissued Patent
Saito

(10) Patent Number: US RE40,638 E
(45) Date of Reissued Patent: Feb. 17, 2009

(54) IMAGE PICKUP LENS SYSTEM

(75) Inventor: Tomohiro Saito, Kawaguchi (JP)

(73) Assignee: Enplas Corporation, Saitama (JP)

(21) Appl. No.: 11/324,121

(22) Filed: Dec. 29, 2005

Related U.S. Patent Documents

Reissue of:
(64) Patent No.: 6,671,105
Issued: Dec. 30, 2003
Appl. No.: 10/215,764
Filed: Apr. 9, 2002

(30) Foreign Application Priority Data

Aug. 13, 2001 (JP) ..... 2001-245482

(51) Int. Cl.
*G02B 13/18* (2006.01)

(52) U.S. Cl. ..... 359/719; 359/718; 369/112.24

(58) Field of Classification Search ..... 359/717, 359/718, 719, 796, 793, 794, 795, 691, 692, 359/661; 369/112.24, 44.23, 112.26, 112.13
See application file for complete search history.

(56) References Cited

U.S. PATENT DOCUMENTS 6,353,588 B1 * 3/2002 Ori ..... 369/112.24
6,542,314 B2 * 4/2003 Kawabata et al. ..... 359/719
6,671,105 B2 * 12/2003 Saito ..... 359/719

* cited by examiner

*Primary Examiner*—Timothy J Thompson
(74) *Attorney, Agent, or Firm*—William L. Androlia; H. Henry Koda

(57) ABSTRACT

An image pickup lens system includes a lens 1 of a meniscus shape having a first face as a [convex] *concave* face, and a diaphragm 2 disposed on an object side of the lens 1. The lens 1 meets the following conditions: Y'/fl equal to or larger than 0.6; Dt/Dc is equal to or smaller than 0.9 and equal to or larger than 0.5; and $Ap_2/Am_2$ is equal to or larger than 0.9. Thus, even when an image pickup element is of a reduced size, a desired optical performance can be maintained, and it is possible to produce a lens easily with a back focal length ensured.

3 Claims, 7 Drawing Sheets

IMAGE PICKUP LENS SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an image pickup lens system and particularly, to an image pickup lens system of a single lens construction, which is used in an image pickup device (e.g., a CCD camera) utilizing an image pickup element such as CCD, CMOS and the like mounted in a mobile telephone or the like, and which can be reduced in weight and size.

2. Description of the Related Art

In recent years, the multimedia have been developed remarkably, and for example, the demand for a camera utilizing an image pickup element such as CCD, CMOS and the like adapted to be mounted in a portable computer, a visual telephone, a mobile telephone and the like, e.g., a CCD camera, is being increased remarkably. Such a CCD camera is required to be mounted in a limited space and for this reason, it is desired that the CCD camera is small in size and lightweight.

Therefore, it is also desired that an image pickup lens system used in such a CCD camera is likewise small in size and lightweight.

A single-lens system using a single lens is conventionally used as such an image pickup lens system.

There is such a conventionally known image-pickup lens systems of a single lens type disclosed, for example, in Japanese Patent Application Laid-open No.10-282410 and the like.

A ¼ inch sensor (having a diagonal dimension of about 4.5 mm) has been conventionally used in many cases as a solid image pickup element mounted in a mobile telephone. In recent years, however, a 1/7 inch sensor (having a diagonal dimension of about 2.6 mm) of a further reduced size has been used mainly in place of the above-described ¼ inch sensor.

In the image pickup lens system of such an extremely small size, it is necessary to meet the following conditions:

First of all, in the image pickup element such as CCD, CMOS and the like, 100% of light obliquely entering into the image pickup element cannot be utilized for the structural reason, unlike a silver-salt film and hence, it is required that light enters into a lens at an angle closer to the vertical at any position on the image pickup element. In other words, it is required that a telecentric property is high, and a distance between the image pickup element and a pupil is large.

In the image pickup element, light is sensed by each of picture elements provided in the image pickup element, but the sensitiveness of each picture element within the image pickup element is uniform and hence, it is desirable that the amount of light entering into the image pickup element is kept constant at any position within the image pickup element. In other words, it is required that the amount of light is uniform in a central portion and a peripheral portion of the image pickup element and hence, it is required that the amount of light in the peripheral portion ensured as much as possible.

These conditions are more important than those in the prior art, because the size of each picture element is reduced with a reduction in size of the image pickup element and as a result, the sensitiveness is also reduced.

Further, in general, a cover glass is disposed on a surface of the image pickup element, and depending on the application, any one of various filters (such as an IR cutting filter, a low-band pass filter and the like) is also inserted. Therefore, a relatively long back focal length is required.

For example, in an image pickup lens of a wide-angle type used in the ¼ inch sensor, it is relatively easy to ensure a distance between the image pickup element and a pupil and a back focal length, because the focal length is as relatively long as about 4 mm.

In an image pickup lens of a wide-angle type used in the 1/7 inch sensor, however, the focal length is as extremely short as about 2 mm. For this reason, the distance between the image pickup element and a pupil and the back focal length are also shortened with a reduction in focal length. Therefore, the following problem is encountered: It is extremely difficult that the image pickup lens used in the conventional ¼ inch sensor is reduced in size and used for the /7 inch sensor. When the size of the lens is merely reduced, as described above, there is also a problem that the accuracies of the thickness of the central portion of the lens and the thickness of a flange are degraded remarkably.

The position of the pupil can be set at the maximum by disposing a diaphragm in the vicinity of the position of the focal length on the side of an object. In this case, however, the following problem is encountered: The size of the entire lens (the thickness and the effective diameter of an optical face) is increased extremely, but also the workability of the lens is degraded.

Further, the back focal length can be improved by forming the lens into a meniscus shape, but there is a problem that if the lens is not of an appropriate shape, the workability of the lens is degraded.

SUMMARY OF THE INVENTION

Accordingly, it is an object of the present invention to provide an image pickup lens system, wherein even when the image pickup element is of a reduced size, a desired optical performance can be maintained, and the lens can be produced easily with a back focal length ensured.

To achieve the above object, according to a first aspect and feature of the present invention, there is provided an image pickup lens system comprising a lens of a meniscus shape having a first face as a [convex] *concave* face located on the object side, and a diaphragm disposed at object side of the lens, the lens meeting the following conditions:

$$Y'/fl \geqq 0.6 \quad (1)$$

$$0.9 \geqq Dt/Dc \geqq 0.5 \quad (2)$$

$$1.0 \geqq Ap_2/Am_2 \geqq 0.9 \quad (3)$$

wherein fl is a focal length of the entire lens system;

Y' is a maximum image height

Dt is a thickness of a thinnest portion of the lens in an area including at least one optical face;

Dc is a thickness of a central portion of the lens;

$Ap_2$ is an effective radius of a second face of the lens on the side of the image surface (a maximum radius of a portion through which effective light rays pass); and $Am_2$ is a maximum radius of the second face on the side of the image surface.

With the first feature of the present invention, a large angle of view can be ensured by setting Y'/fl in the expression (1) at 0.6 or more. In addition, if Dt/Dc in the expression (2) is larger than 0.9, the refraction force of the lens is insufficient and hence, a desired focal length can not be realized, band in addition, the correction of various aberrations is insufficient. If Dt/Dc is smaller than 0.5, an unbalanced uniformity of the lens thickness is increased and as a result, the formability of the lens is degraded, and it is difficult to work the optical face. Further, the second face of the lens body on the side of the image surface can be utilized effectively by setting $Ap_2/Am_2$ in the expression (3) at 0.9 or more (the maximum value of $Ap_2/Am_2$ is 1.0). In addition, the radius of the optical face can be suppressed to achieve a reduction in size of the lens, and the optical face formed by working can be utilized without any waste, whereby an amount of light in the peripheral portion of the lens can be ensured and hence, an amount of light in the peripheral portion of the lens can be ensured.

In the present invention, the thickness of the central portion of the lens and the thickness of the peripheral portion of the lens are set in a special relationship by meeting the conditions represented by the expressions (1), (2) and (3). Thus, in a state in which the producible shape of the lens has been maintained, the amount of light in the peripheral portion of the lens can be ensured, and even when the image pickup element is of a reduced size, the performance of the lens can be maintained.

According to a second aspect and feature of the present invention, in addition to the first feature, the lens body meets the following conditions:

$$0.15 \geqq S \geqq 0.03 \quad (4)$$

wherein S is a distance (mm) between the diaphragm and the first face of the lens.

With the second feature, if S in the expression (4) is larger than 0.15 mm, the thickness of the entire optical system is increased and in addition, the effective diameter of the second face of the lens is increased. For this reason, it is difficult to reduce the size of the lens, and the formability and workability of the lens are degraded. If S is smaller than 0.03 mm, the position of a pupil is too short, and the angle of incidence of light into a sensor surface is increased, and for this reason, it is difficult to effectively utilize light.

In the present invention, a telecentric property can be ensured by disposing the diaphragm so as to meet the expression (4) and hence, even when the image pickup element is of a reduced size, a good image picture can be obtained.

According to a third aspect and feature of the present invention, in addition to the first or second feature, the lens body meets the following conditions:

$$0.55 \geqq |r_2/fl| \geqq 0.35 \quad (5)$$

$$0.8 \geqq Dc/fl \geqq 0.3 \quad (6)$$

wherein r2 is a radius of curvature of a central portion of the face on the side of the image surface;

fl is a focal length of the entire lens system; and

Dc is a thickness of a central portion of the lens.

With the third feature, if $|r_2/fl|$ in the expression (5) is larger than 0.55, a back focal length cannot be ensured, and various filters and the like cannot be inserted. If $|r_2/fl|$ is smaller than 0.35, it is difficult to work the periphery of the optical face and in addition, the unbalanced uniformity of the lens thickness is increased. Thus, it is impossible to form the lens with a good accuracy. If Dc/fl in the expression (6) is larger than 0.8, the entire optical system is increased in size. If Dc/fl is smaller than 0.3, the thickness of a flange for supporting the peripheral portion of the lens body is insufficient, resulting in a degraded productivity.

In the present embodiment, the size of the lens can be reduced, and a back focal length can be ensured by meeting the expressions (5) and (6), and when the image pickup element is of a reduced size, the lens can be produced easily.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of an embodiment shown in the accompanying drawings.

Figure 1:
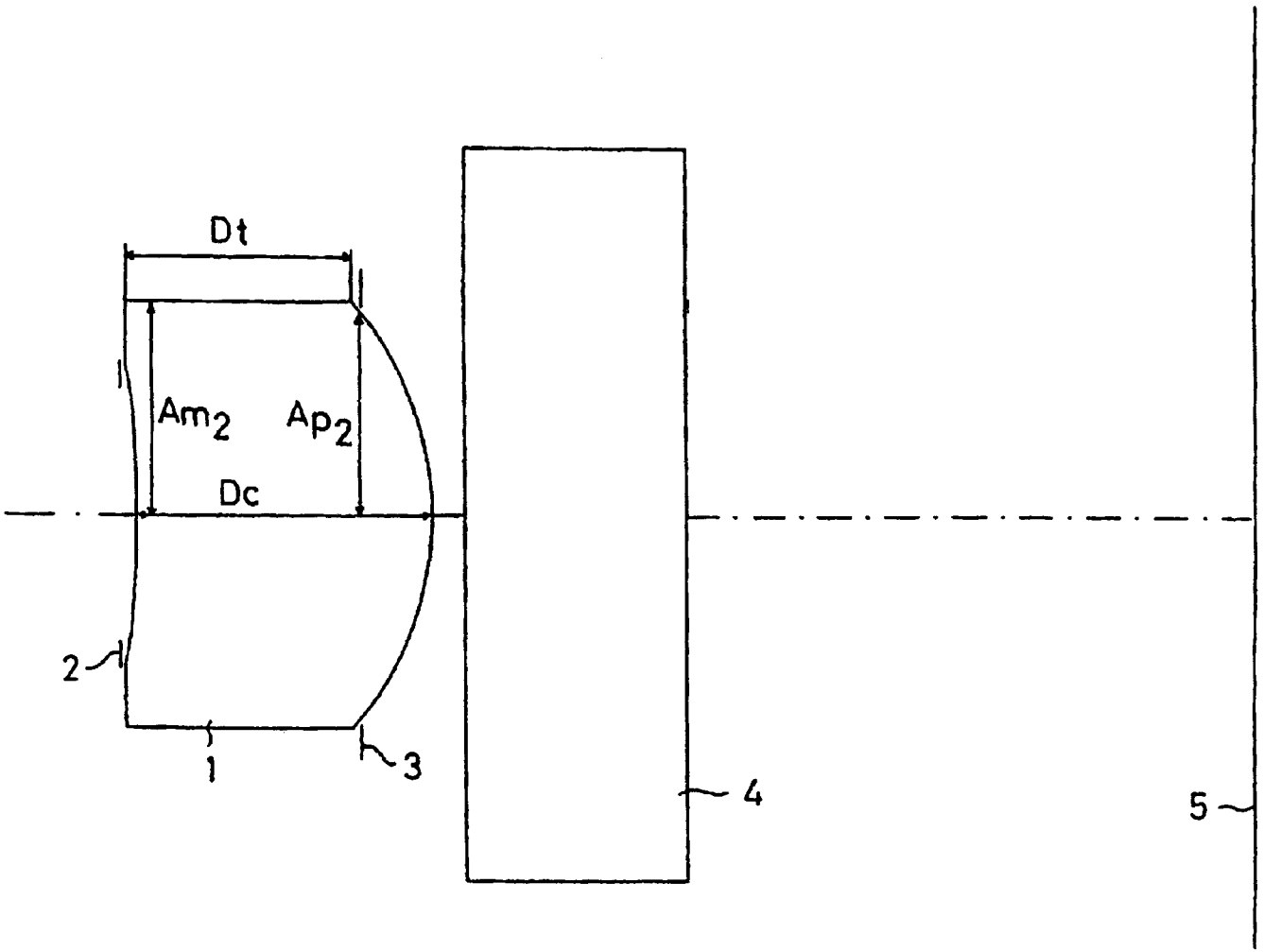
FIG. 1 is a schematic illustration of an arrangement of an embodiment of an image pickup lens system according to the present invention.

FIG. 1 shows the basic structure of an image pickup lens system according to the present invention. This lens includes a lens body 1 made of a resin such as a plastic. In the image pickup lens system in the present embodiment, the meniscus-shaped lens 1 having a first concave surface located on the side of an object is disposed, and a diaphragm 2 is disposed at the object side of the lens 1. A light-amount limiting plate 3 is disposed at a peripheral edge of a second face of the lens 1 on the side of an image surface, and a cover glass 4 and an image pickup surface 5 which is a light-receiving surface of an image pickup element such as CCD or CMOS are disposed on the side of the second face of the lens 1.

In the present embodiment, the lens 1 is adapted to meet the following conditions:

$$Y'/fl \geqq 0.6 \quad (1)$$

$$0.9 \geqq Dt/Dc \geqq 0.5 \quad (2)$$

$$1.0 \geqq Ap_2/Am_2 \geqq 0.9 \quad (3)$$

wherein fl is a focal length of the entire lens system; Y' is a maximum image height (a length equal to ½ of a diagonal line in an image pickup area on the image pickup surface 5); Dt is a thickness of a thinnest portion in an area including at least one optical face of the lens; Dc is a thickness of a central portion of the lens; $Ap_2$ is an effective radius of the optical face on the side of the image surface (a maximum radius of a portion through which effective light rays pass); and $Am_2$ is a maximum radius of the optical face on the side of the image surface (a radius of the optical face as worked).

A large angle of view can be ensured by setting Y'/fl in the expression (1) at 0.6 or more.

If Dt/Dc in the expression (2) is larger than 0.9, the refraction force of the lens is insufficient and hence, a desired focal length can be realized, but also the correction of various aberrations is insufficient. If Dt/Dc is smaller than 0.5, an unbalanced uniformity of the lens thickness is increased and as a result, the formability of the lens is degraded, and it is difficult to work the optical face. It is more preferable that Dt/Dc is equal to or larger than 0.7.

Further, the second face of the lens 1 on the side of the image surface can be utilized effectively by setting $Ap_2/Am_2$ in the expression (3) at 0.9 or more (the maximum value of $Ap_2/Am_2$ is 1.0). In addition, the radius of the optical face can be suppressed to achieve a reduction in size of the lens, and the optical face formed by working can be utilized without any waste, whereby an amount of light in the peripheral portion of the lens can be ensured.

In the present embodiment, the thickness of the central portion of the lens and the thickness of the peripheral portion of the lens are set in a special relationship by meeting the conditions represented by the expressions (1), (2) and (3). Thus, in a state in which the producible shape of the lens has been maintained, the amount of light in the peripheral portion of the lens can be ensured, and even when the image pickup element is of a reduced size, the performance of the lens can be maintained.

Preferably, the lens 1 is formed to meet the following condition:

$$0.15 \geqq S \geqq 0.03 \quad (4)$$

wherein S is a distance (mm) between the diaphragm 2 and the first face of the lens 1.

If S in the expression (4) is larger than 0.15 mm, the thickness of the entire optical system is increased and in addition, the effective diameter of the second face of the lens 1 is increased. For this reason, it is difficult to reduce the size of the lens 1, and the formability and workability of the lens 1 are degraded. If S is smaller than 0.03 mm, the position of a pupil is too short, and the angle of incidence into a sensor surface is increased. For this reason, it is difficult to effectively utilize light, resulting in a reduction in amount of light in the peripheral portion of the lens.

In the present embodiment, a telecentric property can be ensured by disposing the diaphragm so as to meet the expression (4) and hence, even when the image pickup element is of a reduced size, a good image picture can be obtained.

Further, preferably, the lens body 1 is formed to meet the following conditions:

$$0.55 \geqq |r_2/fl| \geqq 0.35 \quad (5)$$

$$0.8 \geqq Dc/fl \geqq 0.3 \quad (6)$$

wherein $r_2$ is a radius of curvature of the central portion of the surface on the side of the image surface.

If $|r_2/fl|$ in the expression (5) is larger than 0.55, a back focal length cannot be ensured, and various filters and the like cannot be inserted. If $|r_2/fl|$ is smaller than 0.35, it is difficult to work the periphery of the optical face, and the unbalanced uniformity of the lens thickness is increased. Thus, it is impossible to form the lens with a good accuracy.

If Dc/fl in the expression (6) is larger than 0.8, the entire optical system is increased in size (increased both in a direction of an optical axis and in a diametrical direction) If Dc/fl is smaller than 0.3, the thickness of a flange for supporting the peripheral portion of the lens body is insufficient, resulting in a degraded productivity.

In the present embodiment, the size of the lens can be reduced, and a back focal length can be ensured by meeting the expressions (5) and (6), and when the image pickup element is of a reduced size, the lens can be produced easily.

EXAMPLES

Examples of the present invention will be described with reference to FIGS. 2 to 7.

In the examples, F represents an F number; fl represents a focal length of the entire lens system; Y' represents a maximum image height; Dt represents a thickness of a thinnest portion in an area including at least one optical face of a lens; Dc represents a thickness of the central portion of the lens; $Ap_2$ represents an effective radius of the optical face on the side of an image surface (a maximum radius of a portion through which effective light rays pass; $Am_2$ represents a maximum radius of the optical face on the image surface (a radius of the optical face as worked; S represents a distance between a diaphragm 2 and a first face of a lens 1; $r_2$ represents a radius of curvature of the central portion of a second face of the lens 1; r represents a radius of curvature of each of the optical faces; d represents a lens thickness or an air gap, and nd represents a refractive index.

If a Z axis is taken in a direction of an optical axis; an X axis is taken in a direction perpendicular to the optical axis, and a direction of travel of light is defined to be positive, the aspherical shape of the lens is represented by the following equation:

$$Z = \frac{\frac{x^2}{r}}{1 + \sqrt{1 - (k+1)\frac{x^2}{r^2}}} + ax^4 + bx^6 + cx^8$$

wherein each of k, a, b and c is an aspherical factor.

Example 1

Figure 2:
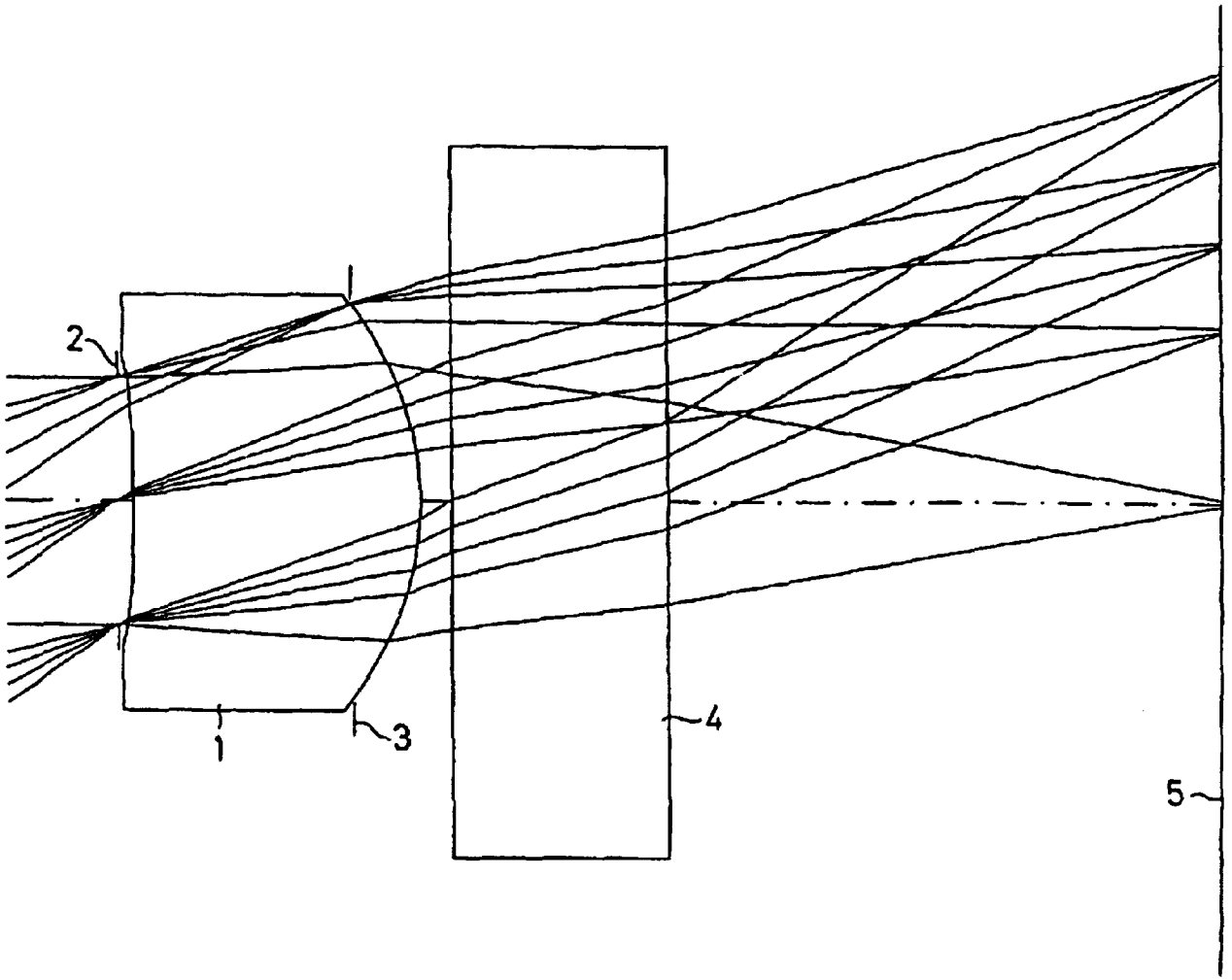
FIG. 2 is a schematic illustration showing an arrangement of a first example of an image pickup lens system according to the present invention.

FIG. 2 shows a first example of the present invention. This example is an image pickup lens system having an arrangement shown in FIG. 1. The image pickup lens system in this example is set under the following conditions:

F=2.8; fl=2.19 mm; Y'=1.35 mm; Dc=0.90 mm; Dt=0.70 mm; $Am_2$=0.65 mm; $Ap_2$=0.62 mm; S=0.05 mm; and $r_2$=0.99 mm.

| Face | Radius r of curvature | Distance d | Refractive index nd | Abbe constant νd |
|---|---|---|---|---|
| (1) Diaphragm | 0.000 | 0.0500 | | |
| (2) First face of lens | −5.153 | 0.9000 | 1.52 | 56.0 |
| (3) Second face of lens | −0.989 | 0.0000 | | |
| (4) First face of cover glass | 0.000 | 0.7000 | 1.52 | 64.2 |
| (5) Second face of cover glass | 0.000 | 1.8597 | | |
| (6) CCD face | | | | |

-continued

| | K | A | B |
|---|---|---|---|
| 2 | 3.450423e + 001 | −3.596798e − 001 | 1.975480e + 000 |
| 3 | 1.339285e − 001 | 5.011488e − 002 | −5.827157e − 002 |

| | c |
|---|---|
| 2 | −8.831343e + 000 |
| 3 | 7.319106e − 003 |

Under such conditions, Y'/fl=1.35/2.19=0.616 is established to meet the expression (1).

In addition, Dt/Dc=0.70/0.90=0.78 is established to meet the expression (2).

Further, $Ap_2/Am_2$=0.62/0.65=0.95 is established to meet the expression (3).

Yet further, S=0.05 is established to meet the expression (4).

Yet further, $|r_2/fl|$=0.99/2.19=0.452 is established to meet the expression (5).

Yet further, Dc/fl=0.90/2.19=0.411 is established to meet the expression (6).

Figure 3:
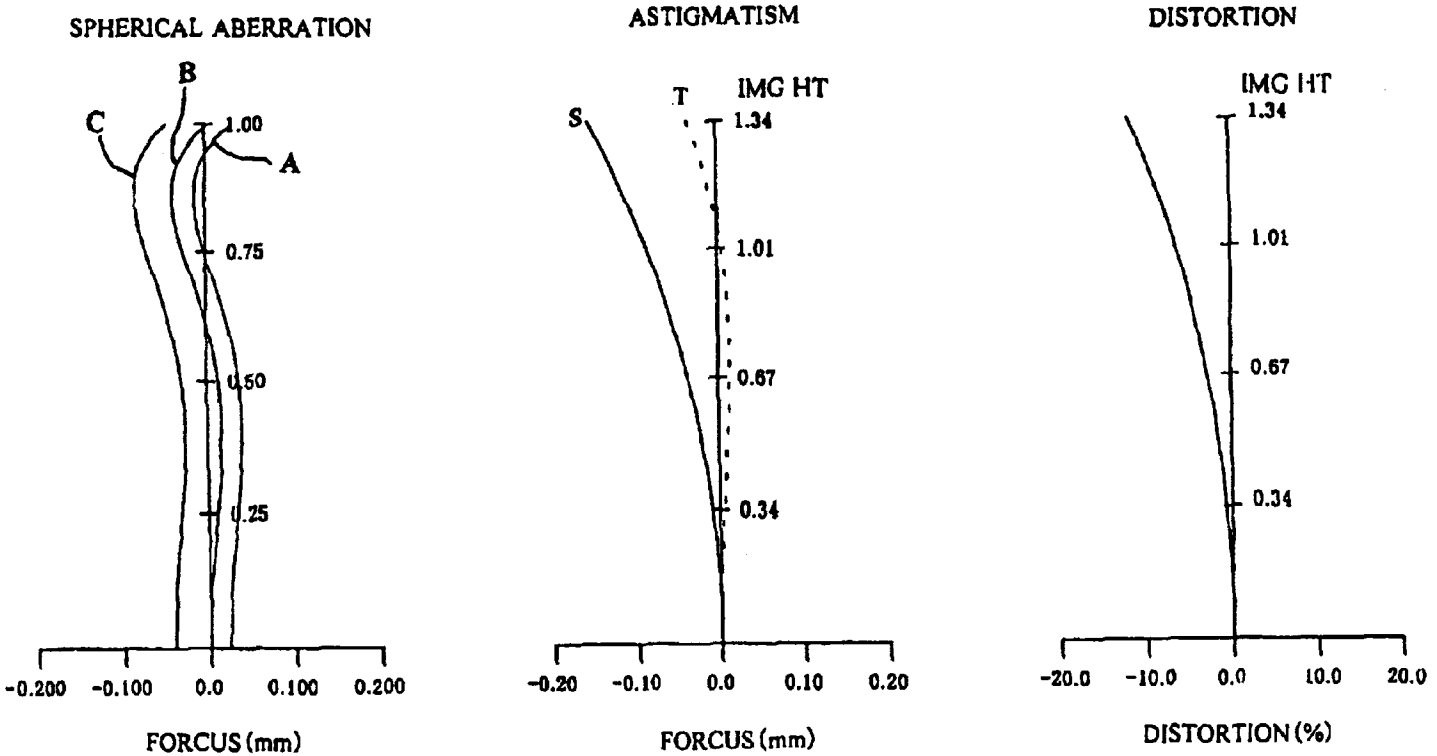
FIG. 3 is graphs showing the spherical aberration, the astigmatism and the distortion of the image pickup lens system shown in FIG. 2.

The spherical aberration, the astigmatism and the distortion in the image pickup lens system of the example 1 are shown in FIG. 3.

As can be seen from FIG. 3, all of the spherical aberration, the astigmatism and the distortion assume substantially satisfactory values, and hence, sufficient optical characteristics can be provided.

Example 2

Figure 4:
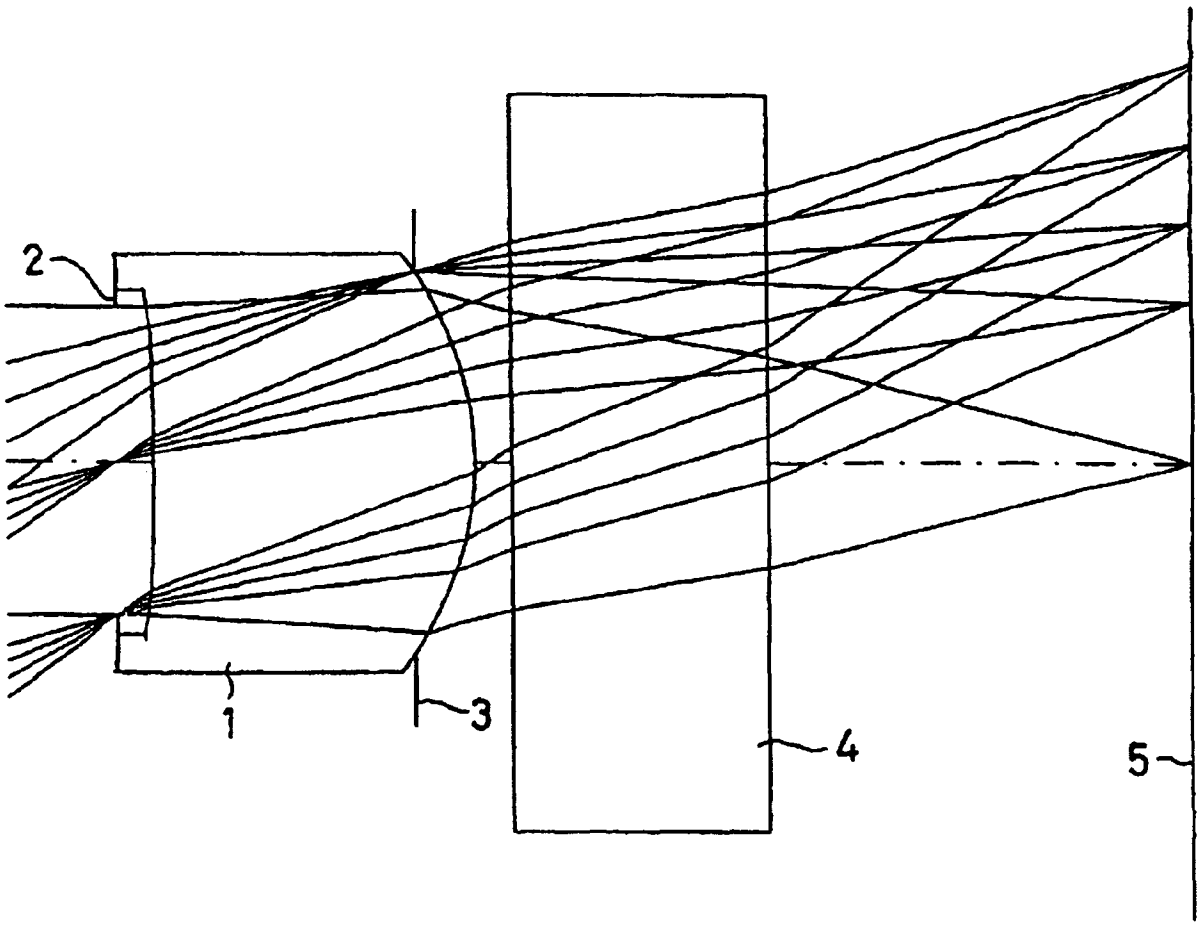
FIG. 4 is a schematic illustration showing an arrangement of a second example of an image pickup lens system according to the present invention.

FIG. 4 shows a second example of the present invention. The image pickup lens system is set under the following conditions:

F=2.0; fl=1.67 mm; Y'=1.05 mm; Dc=0.85 mm; Dt=0.75 mm; $Am_2$=0.55 mm; $Ap_2$=0.50 mm; S=0.10 mm; and $r_2$=0.85 mm.

| Face | Radius r of curvature | Distance d | Refractive index nd | Abbe constant νd |
|---|---|---|---|---|
| (1) Diaphragm | 0.000 | 0.1000 | | |
| (2) First face of lens | −30.971 | 0.8500 | 1.52 | 56.0 |
| (3) Second face of lens | −0.851 | 0.0000 | | |
| (4) First face of cover glass | 0.000 | 0.7000 | 1.52 | 64.2 |
| (5) Second face of cover glass | 0.000 | 1.2213 | | |
| (6) CCD face | | | | |

| | K | a | B |
|---|---|---|---|
| 2 | 0.000000e + 000 | −4.680585e − 001 | 7.754132e − 001 |
| 3 | −1.339285e − 001 | −1.199533e − 001 | −1.180505e − 001 |

| | C |
|---|---|
| 2 | −5.542358e + 000 |
| 3 | −4.081729e − 003 |

Under such conditions, Y'/fl=1.05/1.67=0.629 is established to meet the expression (1).

In addition, Dt/Dc=0.75/0.85=0.88 is established to meet the expression (2).

Further, $Ap_2/Am_2$=0.50/0.55=0.91 is established to meet the expression (3).

Yet further, S=0.10 is established to meet the expression (4).

Yet further, $|r_2/fl|$=0.85/1.67=0.509 is established to meet the expression (5).

Yet further, Dc/fl=0.85/1.67=0.509 is established to meet the expression (6).

Figure 5:
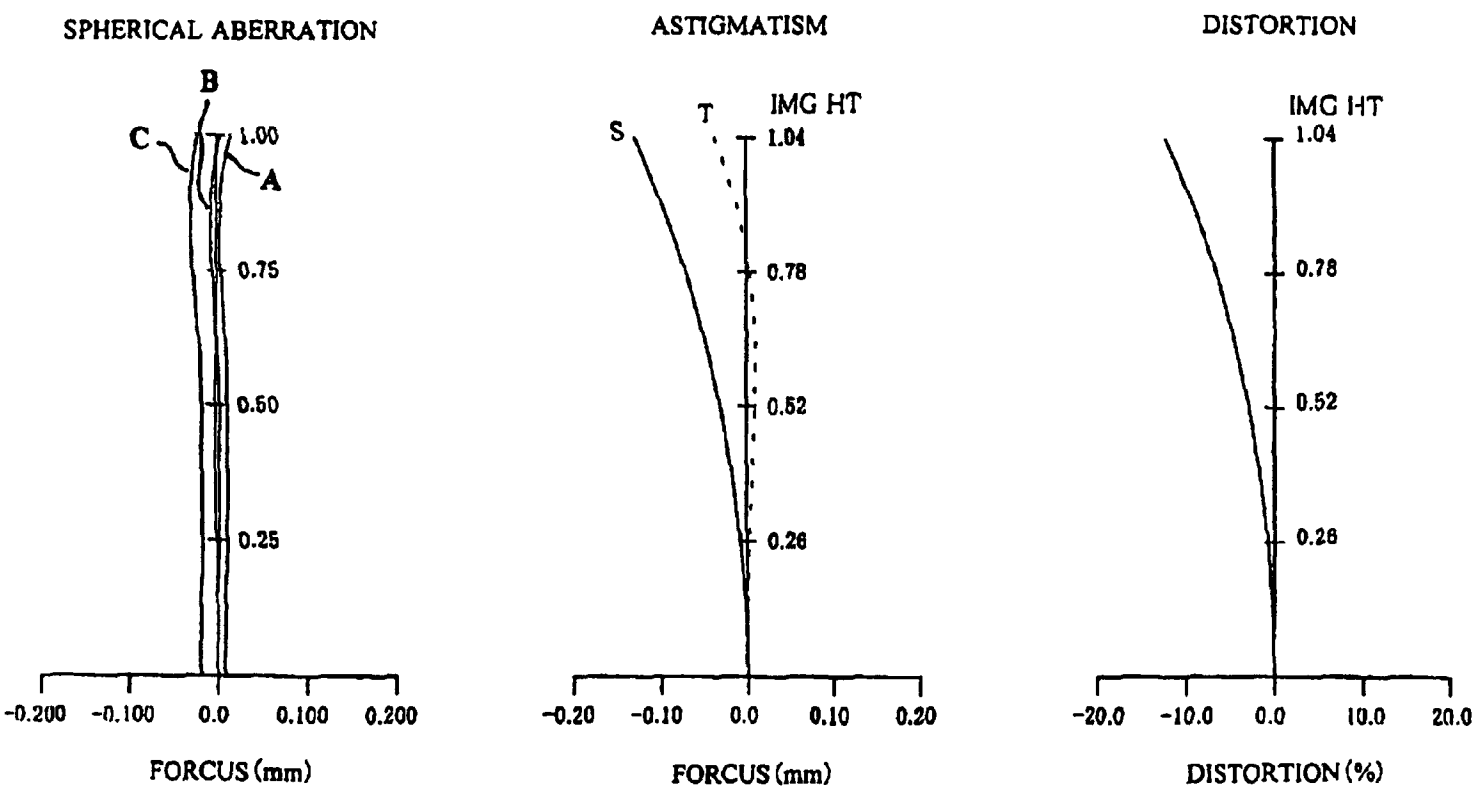
FIG. 5 is graphs showing the spherical aberration, the astigmatism and the distortion of the image pickup lens system shown in FIG. 4.

The spherical aberration, the astigmatism and the distortion in the image pickup lens system of the example 2 are shown in FIG. 5.

As can be seen from FIG. 5, all of the spherical aberration, the astigmatism and the distortion assume substantially satisfactory values, and hence, sufficient optical characteristics can be provided.

Example 3

Figure 6:
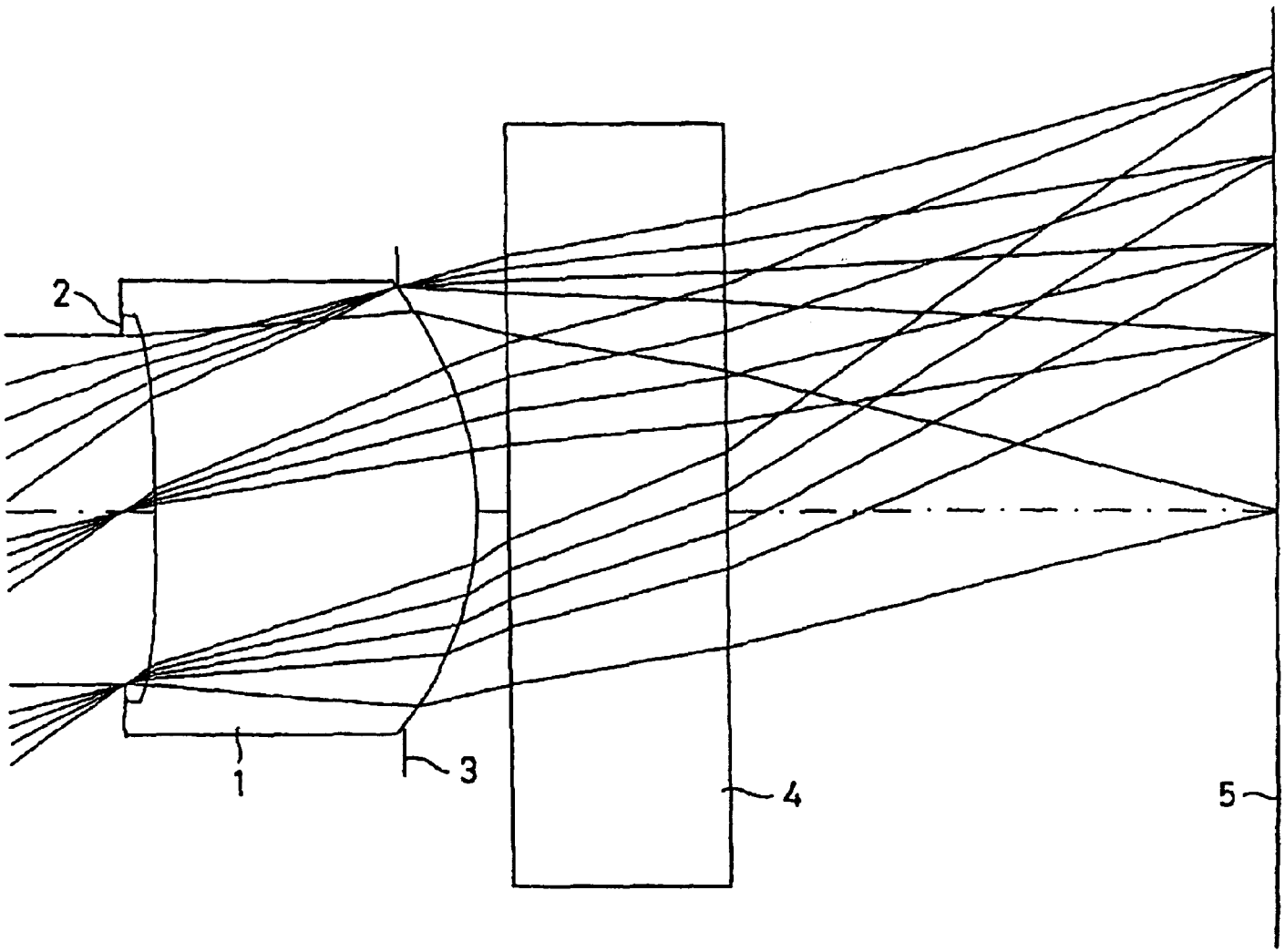
FIG. 6 is a schematic illustration showing an arrangement of a third example of an image pickup lens system according to the present invention.

FIG. 6 shows a third example of the present invention. The image pickup lens system is set under the following conditions:

F=2.0; fl=2.20 mm; Y'=1.35 mm; Dc=1.00 mm; Dt=0.84 mm; $Am_2$=0.70 mm; $Ap_2$=0.68 mm; S=0.10 mm; and $r_2$=1.07 mm.

| Face | Radius r of curvature | Distance d | Refractive index nd | Abbe constant νd |
|---|---|---|---|---|
| (1) Diaphragm | 0.000 | 0.1000 | | |
| (2) First face of lens | −10.950 | 1.0000 | 1.52 | 56.0 |
| (3) Second face of lens | −1.068 | 0.0000 | | |
| (4) First face of cover glass | 0.000 | 0.7000 | 1.52 | 64.2 |
| (5) Second face of cover glass | 0.000 | 1.8054 | | |
| (6) CCD face | | | | |

| | K | A | B |
|---|---|---|---|
| 2 | 0.000000e + 000 | −2.586316e − 001 | 3.667821e − 001 |
| 3 | 2.268728e − 001 | 4.688898e − 002 | 2.073563e − 002 |

| | C |
|---|---|
| 2 | −1.422459e + 000 |
| 3 | 0.000000e + 000 |

Under such conditions, Y'/fl=1.35/2.20=0.614 is established to meet the expression (1).

In addition, Dt/Dc=0.84/1.00=0.84 is established to meet the expression (2).

Further, $Ap_2/Am_2$=0.68/0.70=0.97 is established to meet the expression (3).

Yet further, S=0.10 is established to meet the expression (4).

Yet further, $|r_2/fl|$=1.07/2.20=0.486 is established to meet the expression (5).

Yet further, Dc/fl=1.00/2.20=0.455 is established to meet the expression (6).

Figure 7:
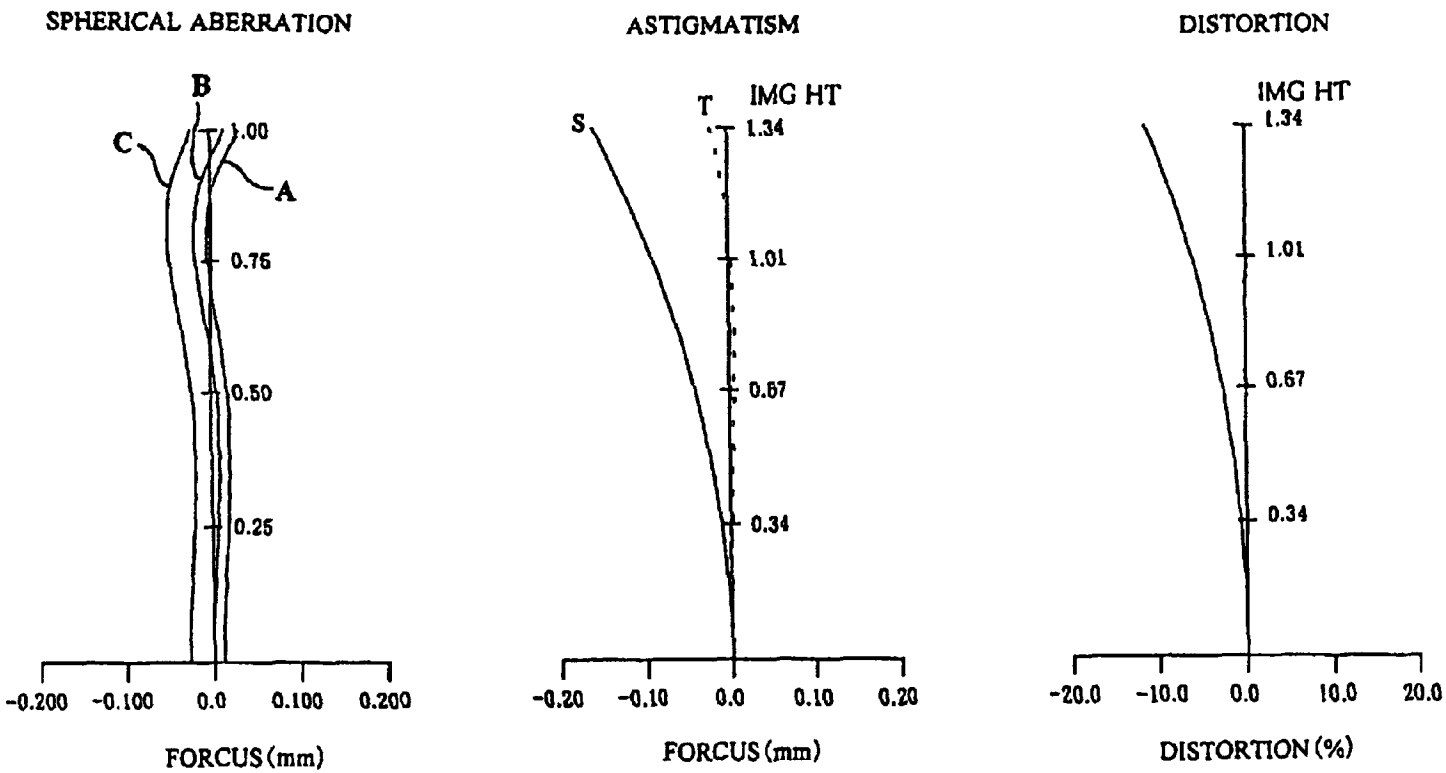
FIG. 7 is graphs showing the spherical aberration, the astigmatism and the distortion of the image pickup lens system shown in FIG. 6.

The spherical aberration, the astigmatism and the distortion in the image pickup lens system of the example 3 are shown in FIG. 7.

As can be seen from FIG. 7, all of the spherical aberration, the astigmatism and the distortion assume substantially satisfactory values, and hence, sufficient optical characteristics can be provided.

Although the embodiment of the present invention has been described in detail, it will be understood that the present invention is not limited to the above-described embodiment, and various modifications may be made as required without departing from the spirit and scope of the invention defined in claims. For example, the light-amount limiting plate disposed on the side of the image surface is necessarily not required, and the present invention is also applicable to an arrangement in which the light-amount limiting plate is not mounted.

What is claimed is:

1. An image pickup lens system comprising a lens of a meniscus shape having a first face as a [convex] *concave* face located on the object side, and a diaphragm disposed at the object side of the lens, said lens meeting the following conditions:

$$Y'/fl \geqq 0.6 \quad (1)$$

$$0.9 \geqq Dt/Dc \geqq 0.5 \quad (2)$$

$$1.0 \geqq Ap_2/Am_2 \geqq 0.9 \quad (3)$$

wherein fl is a focal length of the entire lens system;

Y' is a maximum image height;

Dt is a thickness of a thinnest portion of the lens in an area including at least one optical face;

Dc is a thickness of a central portion of the lens;

$Ap_2$ is an effective radius of a second face of the lens on the side of the image surface (a maximum radius of a portion through which effective light rays pass); and $Am_2$ is a maximum radius of the second face on the side of the image surface.

2. An image pickup lens system according to claim 1, wherein said lens meets the following conditions:

$$0.15 \geqq S \geqq 0.03 \quad (4)$$

wherein S is a distance (mm) between said diaphragm and the first face of said lens.

3. An image pickup lens system according to claim 1 or 2, wherein said lens body meets the following conditions:

$$0.55 \geqq |r_2/fl| \geqq 0.35 \quad (5)$$

$$0.8 \geqq Dc/fl \geqq 0.3 \quad (6)$$

wherein r2 is a radius of curvature of a central portion of the face on the side of the image surface;

fl is a focal length of the entire lens system; and

Dc is a thickness of a central portion of the lens.

* * * * *